United States Patent [19]

Hyde

[11] Patent Number: 4,993,525
[45] Date of Patent: Feb. 19, 1991

[54] DRUM BRAKE SHOE HOLD-DOWN AND RETRACTION SPRINGS AND ANCHOR POST THEREFOR

[75] Inventor: Robert W. Hyde, Dayton, Ohio
[73] Assignee: General Motors Corporation, Detroit, Mich.
[21] Appl. No.: 411,448
[22] Filed: Sep. 25, 1989
[51] Int. Cl.⁵ .............................................. F16D 51/26
[52] U.S. Cl. ................................... 188/328; 188/216; 188/340; 188/341
[58] Field of Search ............... 188/341, 216, 325, 328, 188/327, 329, 340, 330, 331, 335, 205 A; 192/101

[56] References Cited

U.S. PATENT DOCUMENTS

| | | | |
|---|---|---|---|
| 2,642,159 | 6/1953 | House | 188/329 |
| 3,095,950 | 7/1963 | Scheel | 188/216 X |
| 3,203,512 | 8/1965 | Lepelletier | 188/331 X |
| 4,130,189 | 12/1978 | Katagiri et al. | 188/328 |
| 4,494,633 | 1/1985 | Idesawa | 188/330 X |
| 4,762,209 | 8/1988 | Copp | 188/328 |

Primary Examiner—Douglas C. Butler
Attorney, Agent, or Firm—Ernest E. Helms

[57] ABSTRACT

Each of a pair of wire springs has a loop end fitting on an anchor mount for a leading-trailing shoe assembly. Each spring has an arm extending from its loop end along the web of a shoe and terminates in a hook end which fits within a slot in the associated shoe web. The springs will return the brake shoes to their retracted position after serice or parking brake operation by cantilever spring bias force stored in the spring arms as the springs are installed, reengaging the adjuster/strut assembly after actuation of the wheel cylinder during service brake operation; retain the lower ends of the shoes against the anchor plate; and hold the shoes down against the backing plate by torsional spring bias forces of the springs which are stored in the spring loop ends and are directed onto the web of each shoe toward the backing plate through the spring arms and the arm outer portions which are immediately adjacent to the spring arm hook ends. The anchor mount is constructed to receive the loop ends in their torsional spring biased conditions and retain them in that condition, and also to hold the spring loop ends as the cantilever spring bias forces are stored in the spring arms.

3 Claims, 1 Drawing Sheet 4,993,525

DRUM BRAKE SHOE HOLD-DOWN AND RETRACTION SPRINGS AND ANCHOR POST THEREFOR

FIELD OF THE INVENTION

The invention relates to a drum brake assembly of the leading-trailing shoe type in which two cantilever springs, installed as a part of the assembly, hold down the brake shoe assemblies against the backing plate and also retract the shoes after brake actuation.

DESCRIPTION OF RELATED ART

The invention is a modification of the single piece spring and its anchor mount shown in U.S. Pat. No. 4,762,209 issued Aug. 9, 1988, entitled, "Drum Brake Assembly and Shoe Hold-Down and Retraction Spring Therefor" and assigned to the common assignee. That disclosure employs a one-piece spring acting on both brake shoes of a drum brake assembly, the spring having a single partial loop center section connected to a pair of spring arms, and a mounting arrangement for the single partial loop center section. Both hold-down and brake shoe retraction forces are exerted by cantilever spring bias forces stored in the spring.

The invention also relates to U.S. patent application Ser. No. 07/412,302 filed on even date herewith, entitled "Drum Brake Shoe Hold-Down and Retraction Spring and Anchor Post Therefor" and assigned to the common assignee. That disclosure employs a single spring having a pair of spring arms and a multi-loop torsion spring section that mounts on the anchor post. The torsion spring forces stored in the multi-loop section exert the brake shoe retraction forces and the cantilever spring forces stored in the spring arms exert the brake shoe hold-down forces.

SUMMARY OF THE INVENTION

The anchor includes a post which holds the torsionally biased loop ends of a pair of brake shoe retraction and hold-down springs. Each of the two springs is made in one piece and has a looped end formed by an inner straight part, a reverse bend and an outer straight part. A spring arm extends outwardly from the point where it is connected to the inner straight part, and extends in a curvilinear manner along an arc generally commensurate with the arc of a brake shoe. The outer end of the spring arm is formed with a double bend and then terminates in a hooked end. In its free form, before being torsionally biased, the looped end lies in a first plane which is angularly offset from a second plane, the second plane being the plane of the portion of the spring arm adjacent to and joining with the looped end, the offset being in the direction that the hooked end is pointing, which is generally perpendicular to the second plane. The two springs are preferably mirror images of each other, so that one spring is designed to be associated with the leading shoe and the other spring is designed to be associated with the trailing shoe.

The anchor is provided with notches which receive the ends of the spring arms where they join the looped ends, and with apertures which are spaced from the notches toward the plane of the backing plate of the brake assembly. When each spring is installed, its outer straight part of its looped end extends into one of the apertures and the inner end of its spring arm is received in one of the notches so that the first plane containing the looped end inner and outer straight parts is at a greater angle to the second plane than in the free form condition. This exerts a torsional spring bias on the spring, primarily in the inner straight part, so that the spring arms are urged toward the backing plate and, when the hooked ends are connected to the shoe webs through apertures in the webs, the spring arm outer portions adjacent to the hooked ends bear against side surfaces of the shoe webs and exert resilient shoe hold-down forces on the brake shoes.

The spring arms in their free form are so configured that the hooked ends thereof are closer to the axis of rotation of the brake drum than are the shoe web apertures so that the spring arms have to be spread outward to load them in a cantilever manner in order to insert the hooked ends in the shoe web apertures. The cantilever loading of the spring arms provides brake shoe retraction forces which continually urge the brake shoes to their retracted positions.

The springs therefore exert cantilever loaded spring forces on the brake shoes for brake shoe retraction and torsionally loaded spring forces on the brake shoes for shoe hold-down.

DETAILED DESCRIPTION OF THE PREFERRED EMBODIMENT

Figure 1:
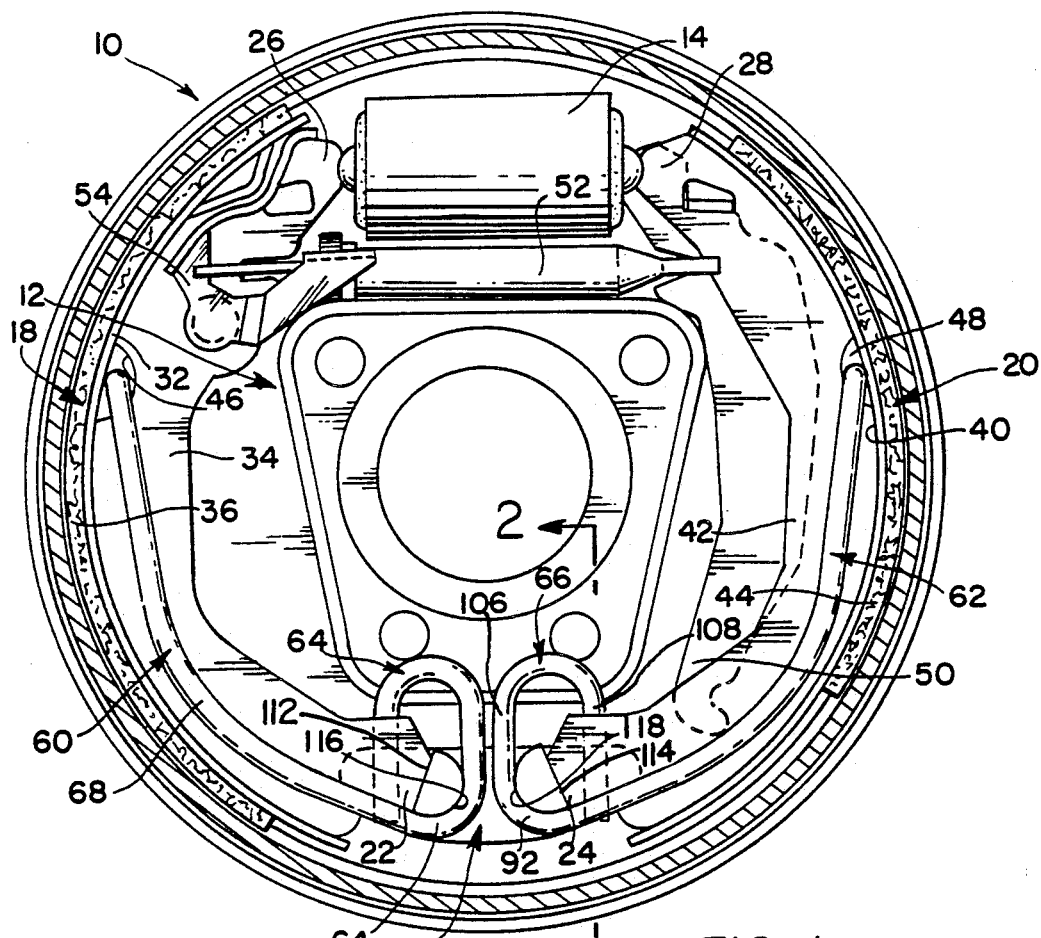
FIG. 1 is a side elevation view of a drum brake assembly embodying the invention.

The drum brake assembly 10 includes a backing plate 12 having mounted thereon a wheel cylinder 14 and an anchor 16 circumferentially opposite the wheel cylinder. A pair of brake shoe assemblies 18 and 20 are also mounted on the backing plate. The shoe assemblies respectively have adjacent ends 22 and 24 engaging the anchor 16 and another set of adjacent ends 26 and 28 engaging the wheel cylinder for actuation. Shoe assembly 18 is formed by shoe rim 32 and shoe web 34, with the brake lining 36 mounted on the shoe rim. Shoe assembly 20 is formed by rim 40 and web 42, with the brake lining 44 mounted on rim 40. Shoe web 34 has a slot 46 formed therethrough adjacent to the rim 32 and positioned substantially mid-way between or somewhat nearer the wheel cylinder 14 than the anchor 16. Similarly, shoe web 42 has a slot 48 formed therein and similarly positioned.

The particular drum brake assembly 10 illustrated is one which also has an arrangement for mechanical actuation for parking brake purposes Therefore the parking brake arm 50 is mounted on web 42 of shoe assembly 20 so as to be actuated as is well known in the art. For this purpose the spreader/adjuster strut 52 is connected with webs 34 and 42 of shoe assemblies 18 and 20 and is engageable by arm 50 for such actuation. A suitable adjuster actuating mechanism 54 is also provided as a part of the shoe assembly 18 and the spreader/adjuster strut 52.

The springs which are a feature of the invention are the first spring 60 and the second spring 62. Spring 60 is formed to include a loop end 64, a spring arm 66 connected to the loop end at the inner end 82 of the spring arm, a curvilinear intermediate portion 68, a double bend 70 formed at the spring arm outer portion 72, and a hooked end 74. The loop end 64 includes the inner straight part 76 joined at its lower end with spring arm 66, and an outer straight part 78 connected with part 76 at the upper ends of the straight parts by a reverse bend 80.

Figure 3:
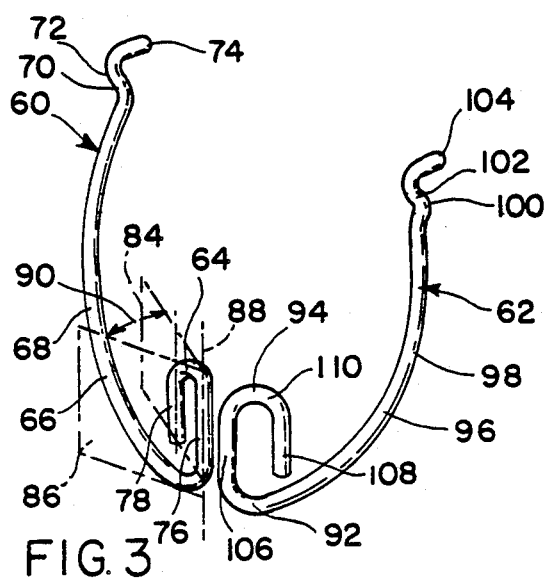
FIG. 3 is a perspective view of the two springs of the invention, showing them in their unbiased or free form conditions in a relative position to each other that they might occupy just before being installed.

The loop end straight parts 76 and 78 and reverse bend 80 preferably lie in a plane 84 which intersects the plane 86 containing the inner end 82 of the spring arm 66 along the axis 88 of the inner straight part 76, with the planes forming an acute angle 90 to each other. This relationship can be visualized in FIG. 3 by use of the dashed lines illustrating the two planes 84 and 86. Angle 90 is shown in FIG. 3 with the spring 60 in its free or unbiased form. As discussed below, this angle is increased during installation of the spring 60 to provide a torsional spring bias in the inner straight part 76 of the loop end 64.

Spring 62 is constructed as a mirror image of spring 60. It includes the loop end 94, spring arm 96, intermediate portion 98, double bend 100, outer portion 102 of spring arm 96, and the hooked end 104 of spring arm 96. The loop end 94 includes the inner straight part 106 joined to the inner end 92 of spring arm 96, the outer straight part 108 and the reverse bend 110 joining the two straight parts 106 and 108. The loop end 94 and the inner end 92 lie in planes, not illustrated, which are comparable to the planes 84 and 86 described above and shown in FIG. 3, and which form an acute angle like angle 90, but also in reverse image from those planes and that angle.

Anchor 16 is shown as being an integral part of a cast backing plate, but it may be a separate part suitably secured to a stamped backing plate. The anchor extends outwardly from the backing plate and has laterally spaced abutments 112 and 114 against which the adjacent shoe ends 22 and 24 respectively abut. Abutments 112 and 114 are curved on their inwardly facing surfaces 116 and 118 as seen in FIG. 1 so as to receive the curved portions of springs 60 and 62 where their inner straight parts 76 and 106 join their spring arm inner ends 82 and 92, respectively. Surfaces 116 and 118 are grooved to provide a mating seating fit with springs 60 and 62, with these grooves appearing as notches in cross section, one such groove or notch 120 being visible in FIG. 2 as it receives the curved portion of the inner end 92 of spring arm 96.

Figure 2:
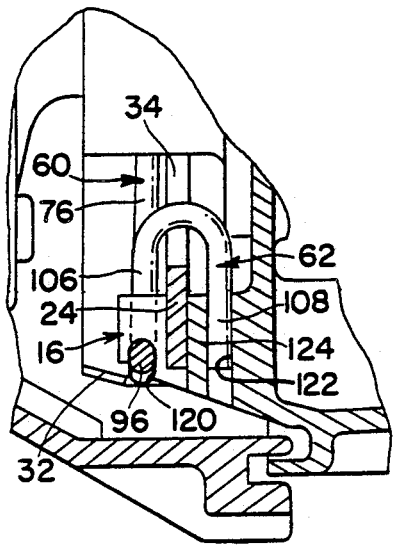
FIG. 2 is a fragmentary cross-section view taken in the direction of arrows 2—2 of FIG. 1 and illustrating the anchor in its relation to the loop end portion of one of the springs and the relation of the spring arm of the other of the springs to the anchor and the backing plate when the springs are installed in the brake assembly.

Each side of anchor 16 has a recessed aperture or slot formed to receive one of the spring loop end outer straight parts. FIG. 2 illustrates the aperture 122 receiving the outer straight part 108. Aperture 122 opens to the right as seen in FIG. 1, generally parallel to the shoe web 42, but positioned between that web and the backing plate 16. The similar aperture receiving the outer straight part 78 of spring 60 is not shown in such detail, but opens leftwardly as seen in FIG. 1 and is likewise generally parallel to shoe web 34 and positioned between that web and the backing plate 16. The spring retaining wall 124 defines the outer sides of aperture 122 and its counterpart aperture. Aperture 122 and the groove or notch 120 are spaced further apart in a direction perpendicular to the plane of the backing plate 12 than are the spring arm inner end 92 and the outer straight part 108 of spring 62 when in their free state, so that when outer straight part is inserted in aperture 122 to the position shown in FIGS. 1 and 2, there is a torsional spring load impressed on the inner straight part 106. The aperture receiving the outer straight part 78 is similarly spaced relative to the groove or notch receiving the inner end 126 of the spring arm 66, with the same result.

The drum brake is assembled by placing the shoe assemblies 18 and 20 in position so that their ends engage the wheel cylinder 14 and the anchor 16 as shown, with strut 52 and adjuster actuating mechanism 54 in place. The springs 60 and 62 are then placed in position by sliding their outer straight ends into their apertures in the anchor 16 and seating the spring arm inner ends in their grooves or notches formed in the anchor. One such aperture 122 and groove or notch 120 are shown in FIG. 2, receiving the outer straight end 108 and the spring arm inner end 92 of spring 62. The spring arms 66 and 96 are then forced outwardly toward the shoe rims 32 and 40 until the spring hooked ends 74 and 104 are respectively inserted into the slots 46 and 48 of shoe webs 34 and 42. The spring arm outer portions 72 and 102 respectively engage the sides of webs 34 and 42. The torsional forces in the spring loop end inner straight parts 76 and 106 act through the spring arms 66 and 96, with the torsional spring forces thus exerted on the shoes toward the backing plate.

The spring arms 66 and 96, having been spread apart to so their hooked ends in the shoe web slots 46 and 48, are cantilever loaded with separate and independent spring forces tending to move the spring hooked ends 74 and 104 toward each other. Therefore the spring arms also exert forces urging the shoe assemblies 18 and 20 toward the retracted position shown.

Thus the springs 60 and perform the function of hold-down springs which have been commonly provided for each shoe assembly, as well as the separate function of retraction springs which in a leading/trailing brake shoe assembly are normally provided adjacent to the upper shoe ends 26 and 28 and also the lower shoe ends 22 and 24. The slots 46 and 48 are so located in the shoe webs, and the spring arms 64 and 66 are of such a length, that the retraction forces of the springs are exerted on the shoes to continually urge the shoe ends into engagement with the wheel cylinder and the anchor Furthermore, the positioning of the portions of the spring arms 66 and 96 adjacent their inner ends 82 and 92 provide security against the shoe ends 22 and 24 being removed laterally from the anchor at any time while the springs are in place. This can be seen in FIG. 1, where these spring arm portions cover the lower ends of the shoe webs.

The embodiments of the invention in which an exclusive property or privilege is claimed are defined as follows:

1. For use in a drum brake assembly which has a brake shoe mounted on a backing plate for movement into braking relation with a brake drum when the drum brake assembly is actuated and for retracting movement to a released position when the drum brake assembly is released, and a brake shoe anchor mounted on the backing plate, the anchor having means for attachment of a brake shoe retraction and hold-down spring thereto:

a brake shoe retraction and hold-down spring having one end being adapted to be attached to said anchor and another end adapted to be attached to the brake shoe for exerting separate brake shoe retraction and hold-down forces thereon, said spring being further having one part thereof adapted to having a torsional spring force stored therein and another part thereof adapted to having a cantilever spring force stored therein when said spring is installed in the brake shoe assembly, said torsional spring force being the brake shoe hold-down force exerted on the brake shoe and said cantilever spring force being the brake shoe retraction force exerted on the brake shoe.

2. The spring of claim 1 in which said spring has a spring arm of which said spring another end is a part and in which said spring one end is formed as a loop end comprising a first straight part connected to said spring arm in spaced relation to said spring another end, a reverse bend, and a second straight part connected to said first straight part by said reverse bend, said first and second straight parts lying in a first plane and said first straight part and a portion of said spring arm immediately adjacent to said first straight part lying in a second plane, said planes forming a first angle therebetween before said spring is installed in said drum brake assembly and adapted to form a second angle substantially greater than said first angle when said spring is attached to said anchor and said first straight part is torsionally spring loaded.

3. A drum brake assembly comprising:

a backing plate having mounted thereon a wheel cylinder and an anchor circumferentially opposite said wheel cylinder, a pair of brake shoe assemblies having a first set of adjacent ends engaging said anchor and a second set of adjacent ends engaging said wheel cylinder for actuation, each of said brake shoe assemblies including a shoe web having a slot formed therein and located at least as near said wheel cylinder as said anchor, and first and second torsional and cantilever biased wire springs combining the functions of shoe hold-down and shoe retraction springs;

said anchor having means mounting said springs in torsional spring bias so that said springs exert shoe hold-down forces on said shoe assemblies and also mounting said springs in cantilever spring bias so that said springs also exert brake shoe retraction forces on said brake shoe assemblies;

each of said springs having a loop end and a spring arm extending from said loop end, said spring arm having an inner end an intermediate portion and an outer portion and a hooked end, said hooked end extending into one of said shoe web slots and said outer portion engaging a side surface of said shoe web so that spring load forces are exerted on said shoe web through said hooked end and through said outer portion respectively as brake shoe retraction forces and brake shoe hold-down forces, said loop end being defined by an inner straight part joined to said spring arm inner end and an outer straight part joined to said inner straight part by a reverse bend, said spring arm inner end and said inner straight part being in a first plane, said outer straight part and said inner straight part being in a second plane intersecting said first plane at an acute first angle in free form condition and, when mounted on said anchor in said brake assembly intersecting at a second angle greater than said first angle so that a torsional spring bias force is exerted on said inner straight part, said torsional spring bias force being transmitted through said spring arm to said shoe web through said spring arm outer portions in a direction toward said backing plate;

said springs when initially mounted on said anchor having said hooked ends positioned in free form substantially closer together than are said shoe web slots, said spring arms then being spread apart to insert said hooked ends in said slots, loading said springs with cantilever spring bias forces which exerted on said shoe webs through said hooked ends and act as brake shoe retraction forces.

* * * * *